(12) United States Patent
Pan

(10) Patent No.: US 12,395,716 B1
(45) Date of Patent: Aug. 19, 2025

(54) DETACHABLE CAMERA CONNECTOR

(71) Applicant: Shenzhen Shenyiheng Intelligent Technology Co., Ltd, Shenzhen (CN)

(72) Inventor: Cheng Pan, Liling (CN)

( * ) Notice: Subject to any disclaimer, the term of this patent is extended or adjusted under 35 U.S.C. 154(b) by 0 days.

(21) Appl. No.: 19/215,419

(22) Filed: May 22, 2025

(30) Foreign Application Priority Data

May 7, 2025 (CN) .......................... 202520879273.1

(51) Int. Cl.
*H04N 23/51* (2023.01)
*H04N 23/54* (2023.01)

(52) U.S. Cl.
CPC ............. *H04N 23/51* (2023.01); *H04N 23/54* (2023.01)

(58) Field of Classification Search
CPC ................................ H04N 23/51; H04N 23/54
See application file for complete search history.

(56) References Cited

U.S. PATENT DOCUMENTS

| | | | |
|---|---|---|---|
| 2008/0252775 A1* | 10/2008 | Ryu ....................... | H04N 23/54 348/374 |
| 2016/0098138 A1* | 4/2016 | Park .................... | G06F 3/04886 345/173 |
| 2018/0251069 A1* | 9/2018 | LaCross ................. | H04N 23/63 |
| 2018/0288291 A1* | 10/2018 | Shimizu ................. | H04N 23/54 |
| 2020/0366822 A1* | 11/2020 | Yang ..................... | H04N 23/54 |
| 2022/0182514 A1* | 6/2022 | Shen .................... | G02B 27/646 |

* cited by examiner

*Primary Examiner* — Amy R Hsu
(74) *Attorney, Agent, or Firm* — Sang Young Han

(57) ABSTRACT

A detachable camera connector is provided, including a positioning housing. The positioning housing is provided with a camera module body, a bottom of the camera module body is provided with a mounting groove, an interior of the mounting groove is engaged with the positioning housing, a camera and an LED light are provided on the camera module body, and a bottom of the positioning housing is provided with a fixture block. The bottom of the positioning housing is further provided with a joint groove, an interior of the positioning housing is provided with a circuit board fixing frame. By setting the connector receptacle, it can be connected with multiple standard interfaces (such as USB Type-C, USB mini, USB micro, 3.5 mm/2.5 mm headphone socket, etc.), and also can compatible with various image transmission specifications such as DVP, MIPI, achieving data transmission with the outside world.

5 Claims, 4 Drawing Sheets

DETACHABLE CAMERA CONNECTOR

CROSS REFERENCE TO RELATED APPLICATION

This application claims priority to Chinese Patent Application No. CN202520879273.1, entitled "DETACHABLE CAMERA CONNECTOR", filed on May 7, 2025, which is hereby incorporated by reference in its entirety.

TECHNICAL FIELD

The present disclosure relates to the technical field of camera connectors, and in particular to a detachable camera connector.

BACKGROUND

As common personal care medical devices, the visual earpick and oral dental endoscope usually integrate miniature camera assembly at the front end thereon, which is connected to a display terminal via wired or wireless means to enable real-time imaging observation of the ear canal or oral cavity.

The existing products generally adopt an integrated design of camera and main body, such structure has the following obvious defects. For example, when the camera malfunctions, the user must replace the entire device. Moreover, a single fixed camera is difficult to adapt to the needs of different usage scenarios (such as differences in camera focal length and angle required for ear canal and oral examinations), which not only increases the cost of use, but also limits the application scope of the equipment. In response to the above problems, it is urgent to develop a detachable camera connector that may quickly separate and replace the device body and camera module, thereby improving the economy and applicability of the product.

SUMMARY

The present disclosure aims to provide a detachable camera connector to address the problems raised in the background.

To achieve the above objectives, the present disclosure adopts the following technical solutions. In some embodiments of the present disclosure, a detachable camera connector is provided, including a positioning housing. The positioning housing is provided with a camera module body, a bottom of the camera module body is provided with a mounting groove, an interior of the mounting groove is engaged with the positioning housing, a camera and an LED light are provided on the camera module body, and a bottom of the positioning housing is provided with a fixture block. The bottom of the positioning housing is further provided with a joint groove, an interior of the positioning housing is provided with a circuit board fixing frame, the circuit board fixing frame is fixedly connected with a PCB (Printed Circuit Board) circuit board, and the PCB circuit board is soldered onto a FPC (Flexible Printed Circuit) circuit board.

In some preferred embodiments of the present disclosure, the positioning housing is detachably connected with a spoon head.

In some preferred embodiments of the present disclosure, the FPC circuit board is provided with a FPC socket, and the FCP circuit board is electrically connected to the camera and the LED light for power supply and data transmission.

In some preferred embodiments of the present disclosure, a connector receptacle is soldered on the FPC circuit board.

In some preferred embodiments of the present disclosure, the connector receptacle is configured as a plug-in connector receptacle.

Compared with the existing technologies, the detachable camera connector of the present disclosure has at least the following beneficial effects.

The detachable camera connector of the present disclosure, the camera module body is connected to the FPC socket via the FPC circuit board, allowing the camera and the LED light on the camera module body to work normally. By setting the connector receptacle, it can be connected with multiple standard interfaces (such as USB Type-C, USB mini, USB micro, 3.5 mm/2.5 mm headphone socket, etc.), and also can compatible with various image transmission specifications such as DVP, MIPI, achieving data transmission with the outside world.

Figure 1:
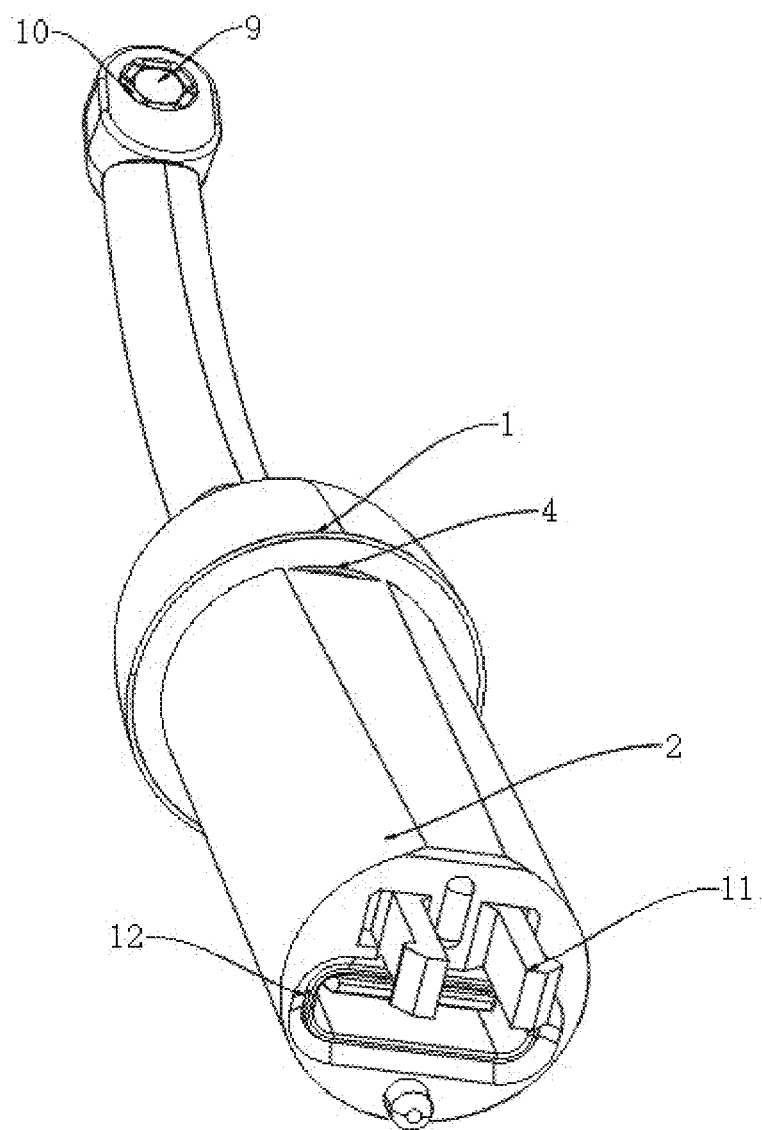
FIG. 1 shows a structural schematic diagram of a detachable camera connector in accordance with some embodiments of the present disclosure.

In the drawings, reference numerals are as follows. 1. Camera module body, 2. Positioning housing, 3. Spoon head, 4. Mounting groove, 5. Circuit board fixing frame, 6. PCB circuit board, 7. Connector receptacle, 8. FPC socket, 9. Camera, 10. LED light, 11. Fixture block, 12. Joint groove, 13. FPC circuit board.

DETAILED DESCRIPTION OF THE EMBODIMENTS

Figure 2:
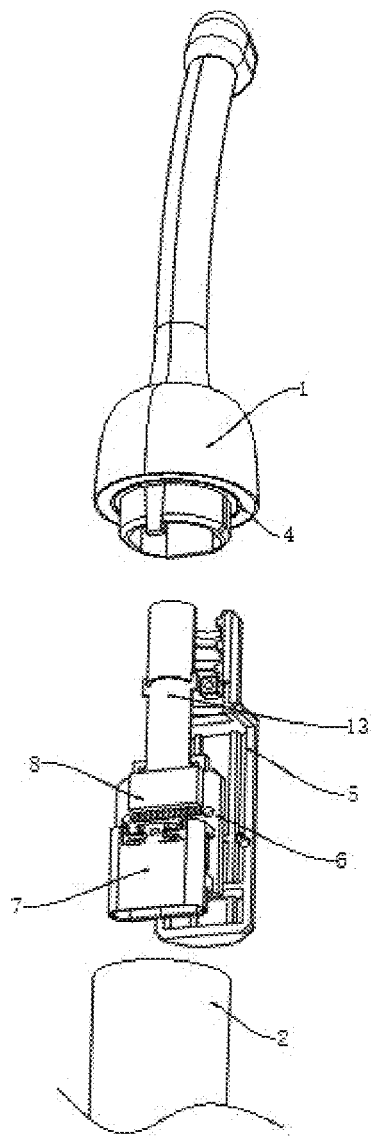
FIG. 2 shows a structural schematic diagram of a camera module body in accordance with some embodiments of the present disclosure.
Figure 3:
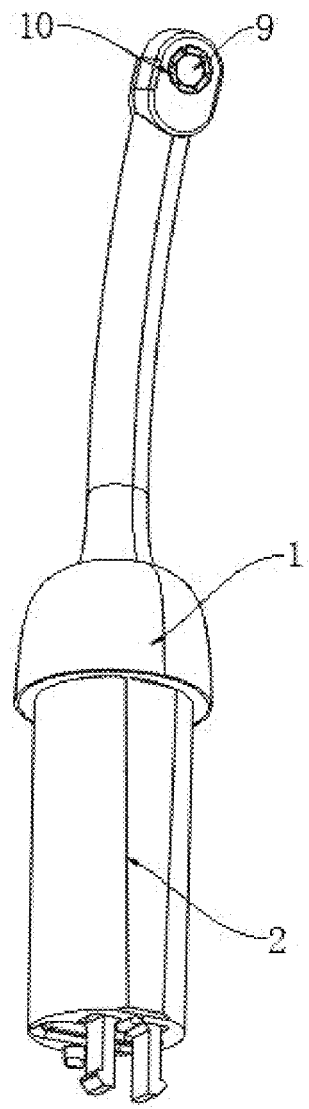
FIG. 3 shows a structural schematic diagram of a camera in accordance with some embodiments of the present disclosure.
Figure 4:
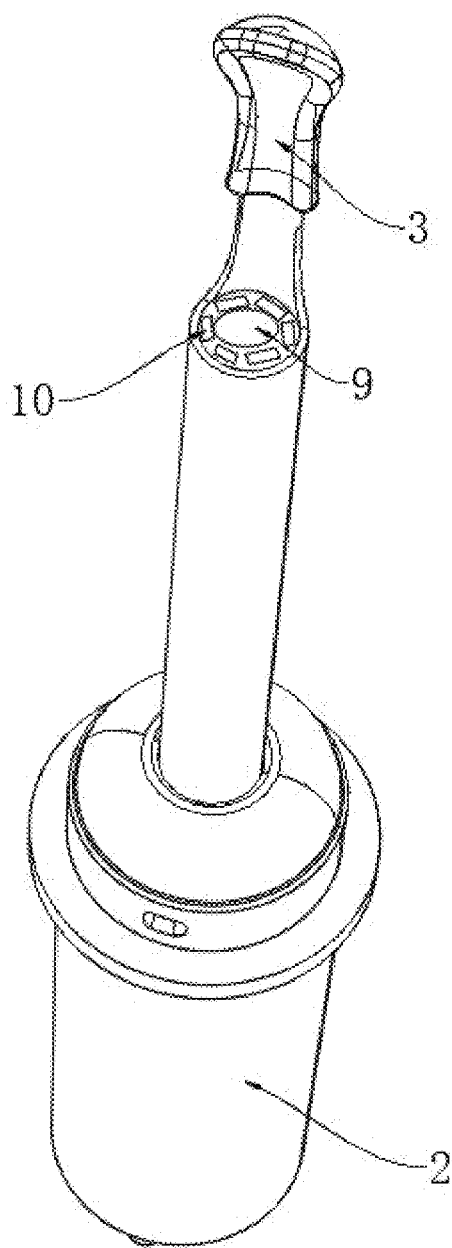
FIG. 4 shows a structural schematic diagram of a positioning housing in accordance with some embodiments of the present disclosure.

Referring to FIG. 1 to FIG. 4, in some embodiments of the present disclosure, a detachable camera connector is provided, including a positioning housing 2. The positioning housing 2 is provided with a camera module body 1, a bottom of the camera module body 1 is provided with a mounting groove 4, an interior of the mounting groove 4 is engaged with the positioning housing 2, a camera 15 and an LED light 16 are provided on the camera module body 1, the camera 15 can be illuminated by the LED light 16. A bottom of the positioning housing 2 is provided with a fixture block 11, and the bottom of the positioning housing is further provided with a joint groove 12, which enables the positioning housing 2 to be installed more smoothly on other devices.

The positioning housing 2 is detachably connected with a spoon head 3, through the detachable design of the spoon head 3 and the camera module body 1, the camera connector of the present disclosure has a wider range of uses and can be applied to different devices.

An interior of the positioning housing 2 is provided with a circuit board fixing frame 5, the circuit board fixing frame 5 is fixedly connected with a PCB circuit board 6, and the PCB circuit board 6 is soldered with a FPC circuit board 13 at one end thereon. The FPC circuit board 13 is provided with a FPC socket 8, and the FCP circuit board 13 is electrically connected to the camera 15 and the LED light 16 for power supply and data transmission. The FPC circuit board is further provided with a photosensitive chip for power supply and data transmission.

A connector receptacle 7 is soldered on the FPC circuit board 6, and the connector receptacle 7 is configured as a plug-in connector receptacle. By setting up the connector receptacle 7, it can be connected with various standard interfaces (such as USB Type-C, USB mini, USB micro, 3.5 mm/2.5 mm headphone socket, etc.), and also can compatible with various image transmission specifications such as DVP, MIPI.

The working principle of the detachable camera connector of the present disclosure is described in detail as follows.

The camera module body 1 is fixed to the positioning housing 2 through the bottom mounting groove 4 to ensure stable installation of the camera 15 and the LED light 16. The fixture block 11 and the joint groove 12 at the bottom of the positioning housing 2 make it easy to install on other devices (such as endoscopes and otoscopes), improving adaptability. The LED light 16 provides auxiliary illumination for the camera 15, ensuring clear imaging even in low light environments. The optical signals collected by the camera 15 are transmitted to the PCB circuit board 6 through the FPC circuit board 13, which also integrates the photosensitive chip responsible for photoelectric signal conversion. The FPC circuit board 13 is connected to the PCB circuit board 6 through the FPC socket 8 to achieve electrical connection between the camera 15, the LED light 16, and the main control circuit, completing power supply and data transmission. The PCB circuit board 6 is soldered with the connector receptacle 7, to support multiple standard interfaces (such as USB Type-C, USB mini, USB micro, 3.5 mm/2.5 mm headphone socket, etc.), and also can compatible with various image transmission specifications such as DVP, MIPI, allowing the camera connector of the present disclosure to flexibly adapt to different external devices. The positioning housing 2 is detachable connected to the spoon head 3 to facilitate the replacement of different functional accessories according to different application scenarios (such as oral endoscopy, ear canal cleaning, etc.), improving the versatility and applicability of the camera connector of the present disclosure. In summary, the camera connector of the present disclosure can achieve fast disassembly, flexible adaption, and stable transmission through modular design and standardized interfaces, making it suitable for various optical imaging application scenarios.

Although the embodiments of the present disclosure have been described and illustrated, it will be understood by one of ordinary skill in the art that various changes, modifications, substitutions, and variations can be made to these embodiments without departing from the principles and concept of the present disclosure. the scope of protection of the present disclosure shall be included by the appended claims and their equivalents.

What is claimed is:

1. A detachable camera connector, comprising a positioning housing;
    wherein the positioning housing is provided with a camera module body, a bottom of the camera module body is provided with a mounting groove, an interior of the mounting groove is engaged with the positioning housing, a camera and an LED light are provided on the camera module body, and a bottom of the positioning housing is provided with a fixture block; and
    wherein the bottom of the positioning housing is further provided with a joint groove, an interior of the positioning housing is provided with a circuit board fixing frame, the circuit board fixing frame is fixedly connected with a PCB circuit board, and the PCB circuit board is soldered onto a FPC circuit board.

2. The detachable camera connector according to claim 1, wherein the positioning housing is detachably connected with a spoon head.

3. The detachable camera connector according to claim 1, wherein the FPC circuit board is provided with a FPC socket, and the FCP circuit board is electrically connected to the camera and the LED light for power supply and data transmission.

4. The detachable camera connector according to claim 3, wherein a connector receptacle is soldered on the FPC circuit board.

5. The detachable camera connector according to claim 1, wherein the connector receptacle is configured as a plug-in connector receptacle.

* * * * *